United States Patent Office.

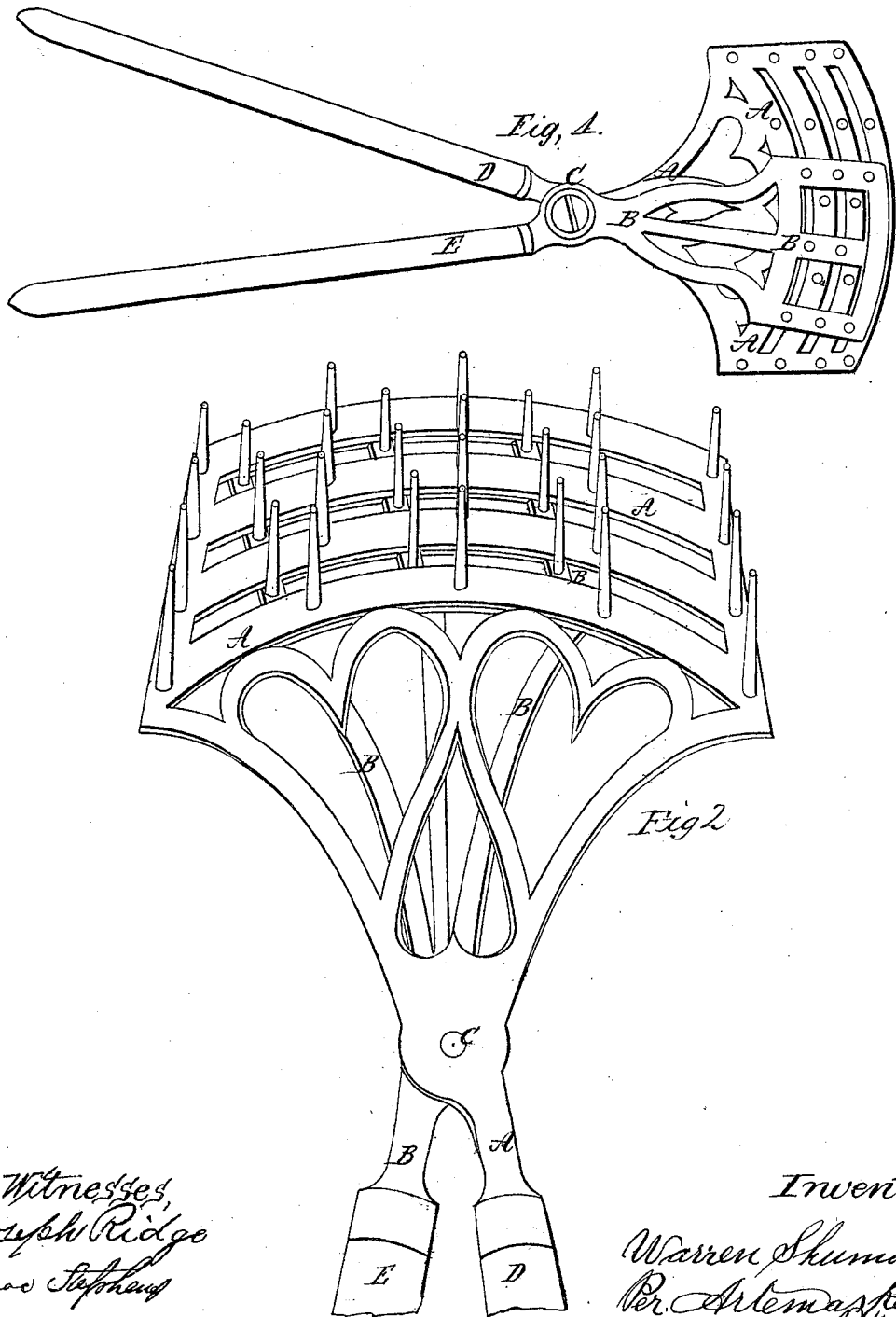

WARREN SHUMARD, OF RICHMOND, INDIANA.

Letters Patent No. 95,940, dated October 19, 1869; antedated October 5, 1869.

IMPROVEMENT IN SOIL-PULVERIZER.

The Schedule referred to in these Letters Patent and making part of the same.

*To all whom it may concern:*

Be it known that I, WARREN SHUMARD, of Richmond, in the county of Wayne, and State of Indiana, have invented a new and improved Soil-Pulverizer; and I do hereby declare that the following is a full and exact description of the same, reference being had to the accompanying drawings, making a part of this specification.

My invention relates to an improved implement for pulverizing the soil in gardens, flower-beds, &c., or in agriculture, in which latter case the implement may be actuated by steam or horse-power communicated through suitable machinery.

The nature of my invention consists in the construction of a rake or spike-toothed harrow, with two sets of teeth, one set of which is passed with a reciprocating or oscillating movement between the teeth of the other set, thereby completely pulverizing the soil as it comes between them.

To enable others skilled in the art to make and use my invention, I will proceed to describe the same with reference to the drawings, in which—

Figure 1 is a plan view of my improved soil-pulverizer, and

Figure 2 is a perspective view of the lower side of the same.

A represents a frame or head, consisting of two or more curved bars, with open spaces between them, and connected by transverse bars at either end. In these curved bars, and also in the end connecting-bars, suitable teeth are inserted, as represented in fig. 2.

B represents another frame, of similar construction to the one above described, and provided likewise with teeth, which work in the spaces between the bars of the lower frame A, and are made of sufficient length to reach the plane occupied by the points of the teeth attached in said frame.

The frame B is pivoted at C to the frame A, and the whole is operated by means of the handles D and E, attached, respectively, to extensions of the frames A and B.

In operation, the implement is drawn through the soil by the handle D, while, by means of the handle E, an oscillating movement is imparted to the frame and teeth B, thereby thoroughly pulverizing the soil to the depth penetrated by the teeth.

Having thus described my said invention,

What I claim, and desire to secure by Letters Patent, is—

The toothed frame A, in combination with the movable toothed frame B, the teeth of which latter are passed, with a reciprocating or oscillating movement, between those of the frame A, substantially as described.

WARREN SHUMARD.

Witnesses:
JOSEPH RIDGE,
ARTEMAS ROBERTS.